| United States Patent [19] | [11] | 4,400,302 |
|---|---|---|
| Goodall et al. | [45] | Aug. 23, 1983 |

[54] OLEFIN POLYMERIZATION CATALYST COMPOSITIONS AND A PROCESS FOR THE POLYMERIZATION OF OLEFINS EMPLOYING SUCH COMPOSITIONS

[75] Inventors: Brian L. Goodall; Adrianus A. van der Nat; Willem Sjardijn, all of Amsterdam, Netherlands

[73] Assignee: Shell Oil Company, Houston, Tex.

[21] Appl. No.: 145,566

[22] Filed: May 1, 1980

[30] Foreign Application Priority Data

May 17, 1979 [GB] United Kingdom ................ 7917240

[51] Int. Cl.$^3$ .............................................. C08F 4/64
[52] U.S. Cl. .................. 252/429 B; 526/125
[58] Field of Search ..................... 252/429 B

[56] References Cited

U.S. PATENT DOCUMENTS

| 3,094,568 | 6/1963 | Hay et al. ................... 252/429 B X |
| 3,878,124 | 4/1975 | Durand et al. ...................... 252/429 |
| 3,917,575 | 11/1975 | Matsuura et al. ........... 252/429 B X |
| 4,107,415 | 8/1978 | Giannini .............................. 526/114 |
| 4,115,319 | 9/1978 | Scata et al. ...................... 252/429 B |
| 4,136,243 | 1/1979 | Appleyard et al. ................ 526/139 |
| 4,146,502 | 3/1979 | Yokoyama et al. ............. 252/429 B |
| 4,151,112 | 4/1979 | Wristers ........................... 252/429 B |
| 4,182,691 | 1/1980 | Ueno et al. ....................... 252/429 B |
| 4,210,738 | 7/1980 | Hermans et al. ........... 252/429 B X |
| 4,220,554 | 9/1980 | Scata et al. ...................... 252/429 B |
| 4,224,183 | 9/1980 | Staiger ............................. 252/429 B |
| 4,235,984 | 11/1980 | Shiga et al. ................. 252/429 B X |
| 4,242,230 | 12/1980 | Ueno et al. ....................... 252/429 B |

FOREIGN PATENT DOCUMENTS

| 4790 | 10/1979 | European Pat. Off. . |
| 7094 | 1/1980 | European Pat. Off. . |
| 2644440 | 4/1977 | Fed. Rep. of Germany . |
| 2340326 | 10/1977 | France . |
| 1359547 | 7/1974 | United Kingdom . |
| 1554340 | 10/1979 | United Kingdom . |

*Primary Examiner*—Patrick Garvin

[57] ABSTRACT

An olefin polymerization catalyst composition comprising: (a) a reaction product of an organoaluminum compound and an electron donor, and (b) a solid component which has been obtained by halogenating a magnesium compound with the formula $MgR_1R_2$ wherein $R_1$ is an alkyl, aryl, alkoxide or aryloxide group and $R_2$ is an alkyl, aryl, alkoxide or aryloxide group or halogen, with a halide of tetravalent titanium in the presence of a halohydrocarbon, and contacting the halogenated product with a tetravalent titanium compound.

32 Claims, No Drawings

OLEFIN POLYMERIZATION CATALYST COMPOSITIONS AND A PROCESS FOR THE POLYMERIZATION OF OLEFINS EMPLOYING SUCH COMPOSITIONS

The present invention relates to olefin polymerization catalyst compositions comprising a magnesium halide and a titanium halide and to a process for the polymerization of olefins using such catalyst compositions.

Numerous proposals are known from the prior art to provide olefin polymerization catalysts obtained by combining a component comprising a magnesium halide and a titanium halide with an activating organoaluminum compound. The polymerization activity and the stereospecific performance of such compositions may be improved by incorporating an electron donor (Lewis base) into the component comprising titanium, into the organoaluminum activating component or into both these components. The catalyst compositions of this type which have been disclosed in the prior art are able to produce olefin polymers in an attractive high yield, calculated as g polymer/g titanium, and also with the required high level of stereoregular polymeric material. However, this advantage is normally achieved at the detriment of polymer yield, calculated as g polymer/g aluminum. The attractive high polymerization activities of the relevant catalyst compositions known from the prior art are only obtained when employing very large amounts of activating organoaluminum compounds, e.g. amounts, defined in the atomic ratio of aluminum to titanium, of at least 50:1, in many cases even 100:1 or more. In addition to this, many of the proposed catalyst compositions have the disadvantage that an adequate control of the molecular weight by polymerizing in the presence of hydrogen cannot be achieved without impairing the stereospecific performance of the catalyst compositions.

German Offenlegungsschrift No. 2,640,679 and its equivalent U.S. Pat. No. 4,115,319 to Scota et al is concerned with catalyst compositions comprising (a) a reaction product of an organoaluminum compound and an electron donor and (b) a solid component, comprising a magnesium halide and a titanium halide, which component has been obtained by halogenating a magnesium compound containing at most one halogen atom per magnesium atom with a halogenating agent other than a titanium halide, and reacting the solid so produced with a titanium compound. Suitable halogenating agents are said to be i.a. halohydrocarbons. However, the halogenation action of such halohydrocarbons is very poor as will be shown in the comparative example included herein. Halogenation of magnesium dialkoxides or diaryloxides by reacting with a titanium tetrahalide in the presence of an inert hydrocarbon solvent has been proposed in German Offenlegungsschrift No. 2,729,196. The halogenated reaction product may be modified by reacting with an electron donor.

In accordance with the invention a very active catalyst composition for olefin polymerization comprises (a) a reaction product of an organoaluminum compound and an electron donor, and (b) a solid component which has been obtained by halogenating a magnesium compound with the formula $MgR_1R_2$ wherein $R_1$ is an alkyl, aryl, alkoxide or aryloxide group and $R_2$ is an alkyl, aryl, alkoxide or aryloxide group or halogen, with a halide of tetravalent titanium in the presence of a halohydrocarbon and subsequently, contacting the halogenated product with a tetravalent titanium compound.

Examples of halogen containing magnesium compounds that can be used as starting materials for the halogenating reaction are alkyl and aryl magnesium halides, alkoxy and aryloxy magnesium halides, such as butyl magnesium chloride, hexyl magnesium bromide, isobutoxy magnesium chloride, ethoxy magnesium bromide, phenoxy magnesium iodide, cumyloxy magnesium bromide, naphthenoxy magnesium chloride, naphthyl magnesium iodide, phenyl magnesium chloride and cumyl magnesium iodide.

Preferred magnesium compounds to be halogenated are selected from magnesium dialkoxides, magnesium diaryloxides, dialkyl and diaryl magnesium compounds and alkyl aryl magnesium compounds. In such compounds the alkyl or alkoxide groups preferably have from 2 to 8 carbon atoms. Examples of these preferred groups of compounds are magnesium di-isopropoxide, magnesium diethoxide, magnesium dibutoxide, magnesium diphenoxide, magnesium dinaphthenoxide and ethoxy magnesium isobutoxide, diethyl magnesium, dibutyl magnesium, di-n.amyl magnesium, dicyclohexyl magnesium, di-isopropyl magnesium, isobutylpropyl magnesium, octylisoamyl magnesium, ethylheptyl magnesium, naphthylphenyl magnesium, cumylphenyl magnesium, diphenyl magnesium, ethylphenyl magnesium and isobutylnaphthyl magnesium.

Magnesium compounds comprising one alkyl group and one alkoxide or aryloxide group can also be employed as well as compounds comprising one aryl group and one alkoxide or aryloxide group. Examples of such compounds are phenyl magnesium phenoxide, ethyl magnesium butoxide, ethyl magnesium phenoxide and naphthyl magnesium isoamyloxide.

In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e. yielding magnesium halides in which the atomic ratio of halogen to chlorine is at least 1.5. The most preferred reactions are those leading to fully halogenated reaction products, i.e. magnesiumdihalides. Such halogenation reactions are suitably effected by employing a molar ratio of magnesium compound to titanium compound of 0.005 to 2.0 preferably 0.01 to 1.0. These halogenation reactions may proceed in the additional presence of an electron donor and/or an inert hydrocarbon diluent or solvent. It is also possible to incorporate an electron donor into the halogenated product. When using an inert diluent or solvent this should of course not be used as a complete substitute for the halohydrocarbon, for it is an essential feature of this invention that the halogenation reaction proceeds in the presence of a halohydrocarbon.

Suitable halides of tetravalent titanium are aryloxy- or alkoxy-di- and -trihalides, such as dihexanoxy-titanium dichloride, diethoxy-titanium dibromide, isopropoxy-titanium tri-iodide, phenoxytitanium trichloride, and titanium tetrahalides, preferably titanium tetrachloride.

Suitable halohydrocarbons are compounds such as butyl chloride, phenyl chloride, naphthyl chloride, amyl chloride, but more preferred are hydrocarbons which comprise from 1 to 12, particularly less than 9, carbon atoms and at least two halogen atoms. Examples of this preferred group of halohydrocarbons are dibromo methane, trichloro methane, 1,2-dichloro ethane, dichloro-fluoro ethane, trichloro propane, dichlorodibromo benzene, trichloro cyclohexane, dibromodifluoro decane, hexachloro ethane and tetrachloro isooctane. Carbon tetrachloride is the most preferred halohydrocarbon.

The halogenation normally proceeds under formation of a solid reaction product which may be isolated from the reaction medium by filtration, decantation or another suitable method and subsequently washed with an inert hydrocarbon diluent, such as n-hexane, isooctane or toluene, to remove any unreacted material, including physically absorbed halohydrocarbon.

As compared with the catalyst compositions that have been proposed in the prior art and which are prepared by halogenating magnesium compounds with a titaniumtetrahalide, the presence of the halohydrocarbon during halogenation of the magnesium compound in accordance with the invention brings about an unexpected increase in the polymerization activity of the resulting catalyst compositions. The reasons for this increase are not exactly known. If the halohydrocarbon per se would have some halogenating action, this action is in any event negligible compared with the halogenating activity of the titanium compound and in the case of halogenation of magnesium dialkoxides or diaryloxides the halohydrocarbon has no halogenating action.

Subsequent to halogenation, the product is contacted with a tetravalent titanium compound such as a dialkoxy-titanium dihalide, alkoxy-titanium trihalide, phenoxy-titanium trihalide or titanium tetrahalide. The most preferred titanium compound is titanium tetrachloride. This treatment basically serves to increase the content of tetravalent titanium in catalyst component (b). This increase should preferably be sufficient to achieve a final atomic ratio of tetravalent titanium to magnesium in component (b) of from 0.005 to 3.0, particularly of from 0.02 to 1.0. To this purpose the contacting with the tetravalent titanium compound is most suitably carried out at a temperature of from 60° to 136° C. during 0.1–6 hours, optionally in the presence of an inert hydrocarbon diluent. Particularly preferred contacting temperatures are from 70° to 120° C. and the most preferred contacting periods are in between 0.5 to 2.5 hours.

After the treatment with tetravalent titanium compound the catalyst component may be isolated from the reaction medium and washed to remove unreacted titanium compound.

The preferred halogen atom possibly contained in the magnesium compound to be halogenated, in the titanium compound which serves as halogenating agent and in the tetravalent titanium compound with which the halogenated product is contacted, is chlorine.

Suitable electron donors, which are used for preparing catalyst component (a) and which are preferably also used in the preparation of the solid catalyst component (b), are ethers, esters, ketones, phenols, amines, amides, imines, nitriles, phosphines, phosphites, stibines, arsines, phosphoramides and alcoholates. Examples of suitable donors are those referred to in British Specification No. 1,486,194 and its equivalent U.S. Pat. No. 4,136,243 to Applegard et al Offlenlegungsschrift 2,729,196. Preferred donors are esters and diamines, particularly esters of aromatic carboxylic acids, such as ethyl and methyl benzoate, p-methoxy ethyl benzoate, p-ethoxy methyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate, N,N,N',N'-tetramethyl ethylene diamine, 1,2,4-trimethyl piperazine, 2,3,4,5-tetraethyl piperidine and similar compounds. The donor used in one of the catalyst components may be the same as or different from the donor used for preparing the other component.

The organoaluminum compound to be employed in component (a) may be chosen from any of the known activators in olefin polymerization catalyst systems comprising a titanium halide. Hence, aluminum trialkyl compounds, dialkyl aluminum halides and dialkyl aluminum alkoxides may be successfully used. Aluminum trialkyl compounds are preferred, particularly those wherein each of the alkyl groups has 2 to 6 carbon atoms, e.g. aluminum triethyl, aluminum tri-n-propyl, aluminum tri-isobutyl, aluminum triisopropyl and aluminum dibutyl-n-amyl.

Preferred amounts of electron donor contained in component (a), calculated as mol per mol aluminum compound, are chosen from the range of from 0.1 to 1.0, particularly from 0.2 to 0.5.

Preferred amounts of electron donor optionally contained in component (b), calculated as mol per mol of magnesium are those within the range of from 0.05 to 10, particularly from 0.1 to 5.0. The solid catalyst components (b) described herein are novel compositions per se and they are also included within this invention.

To prepare the final polymerization catalyst composition, components (a) and (b) are simply combined, most suitably employing a molar ratio to produce in the final catalyst an atomic ratio of aluminum to titanium of from 1 to 80, preferably less than 50.

The present invention is also concerned with a process for polymerizing an olefin such as ethylene or butylene, preferably propylene, employing the novel catalyst compositions. These polymerizations may be carried out by any one of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst compositions. Polymerization may be effected batchwise or continuously with constant or intermittent supply of the novel catalyst compositions or one of the catalyst components (a) or (b) to the polymerization reactor. The activity and stereospecificity of the novel catalyst compositions are so pronounced that there is no need for any catalyst removal or polymer extraction techniques. Total metal residues in the polymer, i.e. the combined aluminum, chlorine and titanium content, can be as low as 200 ppm, even less than 100 ppm, as will be shown in the examples.

EXAMPLE 1

The polymerization activity of the various catalyst systems described in Examples 2-5 is determined by the following standard polymerization test: Aluminum triethyl (Act) and p-methoxy ethyl benzoate (ED) were mixed in varying amounts during 5 minutes at room temperature in 40 ml iso-octane and introduced into a 1 l autoclave containing 364 g liquid propylene and hydrogen (partial hydrogen pressure 98 kPa). Immediately thereafter the solid catalyst component was introduced into the reactor, in the form of a suspension in 20 ml iso-octane. The autoclave was then heated to 60° C. in 5 minutes and the polymerization was continued at that temperature and a total pressure of 2650 kPa, whilst stirring the contents of the reactor.

After polymerization, remaining unconverted liquid propylene was removed by depressurizing and the polymer was analyzed to determine the contents of Ti, Al and Cl in the polymer and the contents of amorphous material (XS)—i.e. the percentage of material remaining soluble when cooling a solution of polymer in xylene from its boiling point to room temperature. No intermediate treatments to deactivate the catalyst or to purify the polymer by extraction were employed.

In the Table given below the Al/Ti molar ratio in the catalyst systems is expressed as a ratio of x:1, x having the values shown.

EXAMPLE 2

10 g of magnesium turnings (412 mat) were reacted at room temperature with ethanol employing a mixture comprising 100 ml ethanol, 20 ml xylene, 5 mg of mercuric chloride (0.02 mmol) and 3 mg of iodine (0.02 mmol). The reaction took 5 hours for completion. Subsequently, the liquid phase was removed by distillation and the resulting solid was dried under a nitrogen vacuum.

10 mmol of the magnesium di-ethoxide so prepared were suspended in 15 ml carbon tetrachloride and at 75° C. 0.48 ml ethyl benzoate (3.3 mmol) and 15 ml of titanium tetrachloride (136 mmol) were added. The suspension was stirred at that temperature for 2 hours. The solid formed was isolated from the reaction medium by decantation and washed five times with iso-octane (component a).

This component (a) was suspended in 15 ml titanium tetrachloride (136 mmol) at 80° C. and the suspension was stirred at that temperature for 2 hours. After decanting the solid was washed five times with iso-octane. The product so obtained (component b) had a titanium content, calculated as metal on the total weight of the solid, of 2.3% wt.

EXAMPLE 3

For comparison purposes another solid catalyst component was prepared by suspending 50 mmol of the magnesium diethoxide prepared as described in example 2 in a mixture of 75 ml toluene and 16.7 mmol ethyl benzoate. Then 75 ml liquid TiCl$_4$ (180 mmol) were added and the mixture was stirred at 80° C. during two hours. After isolating the solid by filtration, the solid was washed five times with isooctane at 70° C. There resulted a yellowish solid comprising 3.4%wt of Ti (component c).

EXAMPLE 4

3.6 mmol of n-butyl ethyl magnesium, dissolved in 6 ml n-heptane were mixed with 10 ml iso-octane and 15 ml carbon tetrachloride at $-40°$ C. and at that temperature 157 mg ethyl benzoate (1.0 mmol) and 5 ml titanium tetrachloride (45 mmol) were added. The temperature of the mixture was raised to 70° C. during thirty minutes and kept at that temperature for 1 hour. After isolating the solid formed by decanting the liquid phase, the product was washed three times with iso-octane Then, the solid was suspended at 110° C. in 25 ml liquid titanium tetrachloride and the mixture was stirred for 2 hours. The solid product was isolated by centrifugation and washed six times with iso-octane. This product (component d) contained 1.5%wt of titanium.

EXAMPLE 5

3.6 mmol of butyl magnesium isopropoxide dissolved in 8.0 ml iso-octane were mixed with 10 ml iso-octane, 15 ml carbon tetrachloride and 157 mg ethyl benzoate (1 mmol) at $-40°$ C. Then at that temperature, 6 ml titanium tetrachloride (54 mmol) were added and the mixture was slowly warmed up to 70° C. in 0.5 hours and stirring was continued for another hour. The solid formed was isolated and washed three times with iso-octane. Then, the solid was suspended in 25 ml titanium tetrachloride and stirred for 2 hours at 110° C. After decantation, the solid (component e) was washed six times with iso-octane. The titanium content in this component was 3.6%wt.

The polymerization results obtained when testing components (a) to (e) in the polymerization run described in example 1 are represented in the following Table.

TABLE

| Solid component | | a* | b | b | c* | c* | d | e |
|---|---|---|---|---|---|---|---|---|
| Solid component | mg | 13.2 | 17 | 8 | 9 | 25 | 20 | 10 |
| Act. | mmol | 0.3 | 0.3 | 0.3 | 0.3 | 2.1 | 0.3 | 0.3 |
| ED | mmol | 0.09 | 0.09 | 0.09 | 0.09 | 0.6 | 0.09 | 0.09 |
| Al/Ti | x | 43 | 38 | 76 | 47 | 118 | 48 | 41 |
| Time | hrs | 1.3 | 1.3 | 1.8 | 0.7 | 3.1 | 4 | 3 |
| Yield | g | 14 | 123 | 60 | 6 | 173 | 113 | 45 |
| Yield | kg/g cat | 1.1 | 7.3 | 7.1 | 0.7 | 6.9 | 5.6 | 4.5 |
| Yield | kg/g Ti | 41 | 324 | 316 | 19.5 | 203 | 377 | 128 |
| XS | % | 6.4 | 3.9 | 4.3 | — | 4.8 | 9.7 | — |
| Ti | ppm | 19 | 3 | 3 | — | 4 | 3 | 7 |
| Al | ppm | 403 | 71 | 127 | — | 320 | 71 | 180 |
| Cl | ppm | 214 | 56 | 58 | — | 52 | 100 | 133 |

*for comparison

EXAMPLE 6 (for comparison)

In order to see whether magnesium diethoxide can be halogenated by reaction with carbon tetrachloride, 10 mmol magnesium diethoxide were suspended in a mixture of 15 ml carbon tetrachloride (155 mmol) and 3.3 mmol ethyl benzoate and the suspension was stirred at 75° C. for 2 hours. After washing five times with iso-octane, there resulted a white solid comprising only 0.23%w of Cl, thus showing that only a negligible halogenation had taken place. Hence, this example serves for comparison only.

We claim:

1. A solid component for olefin polymerization catalyst compositions which component has been obtained by halogenating a magnesium compound of the formula MgR'R'' wherein R' is an alkyl or aryl group and R'' is an alkyl or aryl group or halogen, with a halide of tetravalent titanium in the presence of a halohydrocarbon, contacting the halogenated product with a tetravalent titanium compound, and recovering the solid reaction product.

2. A solid component for olefin polymerization catalyst compositions which component has been obtained by halogenating a magnesium compound of the formula MgR'R" wherein R' is an alkyl or aryl group and R" is an alkyl or aryl group or halogen, with a halide of tetravalent titanium in the presence of a halohydrocarbon and an electron donor, contacting the halogenated product with a tetravalent titanium compound, and recovering the solid reaction product.

3. A solid component for olefin polymerization catalyst compositions, containing titanium and magnesium in an atomic ratio of Ti:Mg in the range from 0.02:1 to 1:1, which component has been obtained by contacting a compound MgR'R", in which R' and R" are alkyl groups of 2 to 8 carbon atoms, in a first contacting step with titanium tetrachloride, a chlorohydrocarbon having 1 to 12 carbon atoms per molecule and an electron donor, resulting in a solid which contains Mg, Ti, Cl and electron donor and which has an Mg:Cl atomic ratio of at least 1.5, contacting the resulting solid with titanium tetrachloride in a second contacting step and recovering the solid reaction product.

4. A composition according to claim 3 wherein said chlorohydrocarbon is carbon tetrachloride.

5. A solid component for olefin polymerization catalyst compositions, containing titanium and magnesium in an atomic ratio of Ti:Mg in the range from 0.02:1 to 1:1, which component has been obtained by converting a compound MgR'R" in which R' and R" are alkyl groups of 2 to 8 carbon atoms to magnesium dichloride by reaction with titanium tetrachloride in a molar ratio of MgR'R":titanium tetrachloride in the range from 0.01:1 to 1.0:1 in a first contacting step in the presence of a chlorohydrocarbon having 1 to 12 carbon atoms per molecule and of an aromatic ester electron donor, resulting in a solid which contains Mg, Ti, Cl and electron donor, contacting the resulting solid with titanium tetrachloride in a second contacting step, and recovering the solid reaction product.

6. A composition according to claim 5 wherein said chlorohydrocarbon is carbon tetrachloride.

7. A composition according to claim 3 or 5 in which said chlorohydrocarbon has at least two chlorine atoms per molecule.

8. A composition according to claims 1 or 2, in which the halide of tetravalent titanium and the tetravalent titanium compound are each a titanium tetrahalide.

9. A composition according to claims 3 or 2 in which each electron donor is an ether, ester, amine or phosphine.

10. A composition according to claim 1 in which the atomic ratio of aluminum in component (a) to titanium in component (b) is from 1:1 to 80:1.

11. A composition according to claims 1 or 2 in which the halide of tetravalent titanium and the tetravalent titanium compound are each titanium tetrachloride.

12. A composition according to claims 3 or 2 in which each electron donor is an aromatic ester.

13. A composition according to claims 3, 5 or 2 in which the electron donor is ethyl benzoate.

14. An olefin polymerization catalyst composition comprising (a) a reaction product of an organoaluminum compound and an electron donor, and (b) a solid component which has been obtained by halogenating a magnesium compound of the formula MgR'R" wherein R' is an alkyl or aryl group and R" is an alkyl or aryl group or halogen, with a halide of tetravalent titanium in the presence of a halohydrocarbon, contacting the halogenated product with a tetravalent titanium compound, and recovering the solid reaction product.

15. A composition according to claim 14 in which the atomic ratio of aluminum in component (a) to titanium in component (b) is from 1:1 to 80:1.

16. An olefin polymerization catalyst composition comprising (a) a reaction product of an organoaluminum compound and an electron donor, and (b) a solid component which has been obtained by halogenating a magnesium compound of the formula MgR'R" wherein R' is an alkyl or aryl group and R" is an alkyl or aryl group or halogen, with a halide of tetravalent titanium in the presence of a halohydrocarbon and an electron donor, contacting the halogenated product with a tetravalent titanium compound and recovering the solid reaction product.

17. A composition according to claim 16 in which each electron donor is an ether, ester, amine or phosphine.

18. A composition according to claim 16 in which each electron donor is an aromatic ester.

19. A composition according to claim 16 in which the electron donor in solid component (b) is ethyl benzoate.

20. A composition according to claims 14 or 16 in which the halide of tetravalent titanium and the tetravalent titanium compound are each a titanium tetrahalide.

21. A composition according to claims 14 or 16 in which the halide of tetravalent titanium and the tetravalent titanium compound are each titanium tetrachloride.

22. An olefin polymerization catalyst composition comprising (a) a reaction product of an organoaluminum compound and an electron donor and (b) a solid component according to claims 3, 4, 5 or 6.

23. An olefin polymerization catalyst composition according to claim 22 wherein the organoaluminum compound is an aluminum trialkyl and the electron donor of component (a) is an aromatic ester.

24. An olefin polymerization catalyst composition according to claim 22 wherein the organoaluminum compound is aluminum triethyl and the electron donor of component (a) is ethyl anisate.

25. A composition according to claim 22 in which the atomic ratio of aluminum in component (a) to titanium in component (b) is from 1:1 to 80:1.

26. A composition according to claim 23 in which the atomic ratio of aluminum in component (a) to titanium in component (b) is from 1:1 to 80:1.

27. A composition according to claim 24 in which the atomic ratio of aluminum in component (a) to titanium in component (b) is from 1:1 to 80:1.

28. A process for preparing a catalytic composition which comprises:
(1) reacting a hydrocarbyl magnesium compound with $TiCl_4$ in the presence of a halocarbon compound containing only carbon and halogen atoms or a halohydrocarbon compound containing only carbon, hydrogen and halogen atoms;
(2) contacting the reaction product with $TiCl_4$; and
(3) separating the solid product.

29. A method for the preparation of a solid component for olefin catalyst compositions, comprising halogenating a magnesium compound of the formula MgR'R" wherein R' is an alkyl or aryl group and R" is an alkyl or aryl group or halogen, with a halide of tetravalent titanium in the presence of a halohydrocarbon and an electron donor, separating the solid reaction product from the reaction mixture, optionally washing it with an inert diluent to remove any unreacted material, then contacting the halogenated product with a tetravalent titanium compound in a second contacting step, separating the resulting solid from the liquid medium, and washing it with an inert diluent to remove all unreacted titanium compound.

30. A method for the preparation of a solid component for olefin catalyst compositions, comprising contacting a compound MgR'R", in which R' and R" are alkyl groups of 2 to 8 carbon atoms, in a first contacting step with titanium tetrachloride, a chlorohydrocarbon having 1 to 12 carbon atoms per molecule and an electron donor, resulting in a solid which contains Mg, Ti, Cl and electron donor and which has an Mg:Cl atomic ratio of at least 1.5, separating the solid reaction product from the reaction mixture, optionally washing it with an inert diluent to remove any unreacted material, then contacting the resulting solid with titanium tetrachloride in a second contacting step, separating the resulting solid from the liquid medium, and washing it with an inert diluent to remove all unreacted titanium compound.

31. A method for the preparation of a solid component for olefin polymerization catalyst compositions, comprising converting a compound MgR'R" in which R' and R" are alkyl groups of 2 to 8 carbon atoms to magnesium dichloride by reaction with titanium tetrachloride in a molar ratio of MgR'R":titanium tetrachloride in the range from 0.01:1 to 1.0:1 in a first contacting step in the presence of a chlorohydrocarbon having 1 to 12 carbon atoms per molecule and of an aromatic ester electron donor, resulting in a solid which contains Mg, Ti, Cl and electron donor, separating the solid reaction product from the reaction mixture, optionally washing it with an inert diluent to remove any unreacted material, then contacting the resulting solid with titanium tetrachloride in a second contacting step, separating the resulting solid from the liquid medium, and washing it with an inert diluent to remove all unreacted titanium compound.

32. A method according to claims 30 or 31 in which said chlorohydrocarbon has at least two chlorine atoms per molecule.

* * * * *